A. V. ROE.
LIGHT FRAMED STRUCTURE SUCH AS AIRCRAFT WINGS AND THE LIKE.
APPLICATION FILED MAY 12, 1917.
1,301,747.
Patented Apr. 22, 1919.
2 SHEETS—SHEET 1.
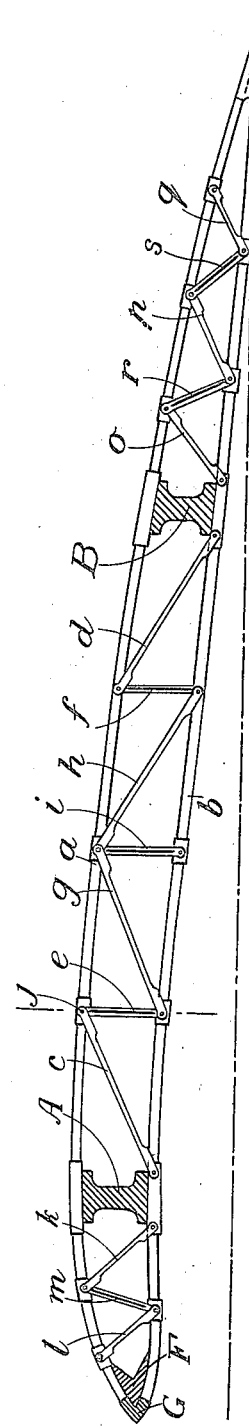
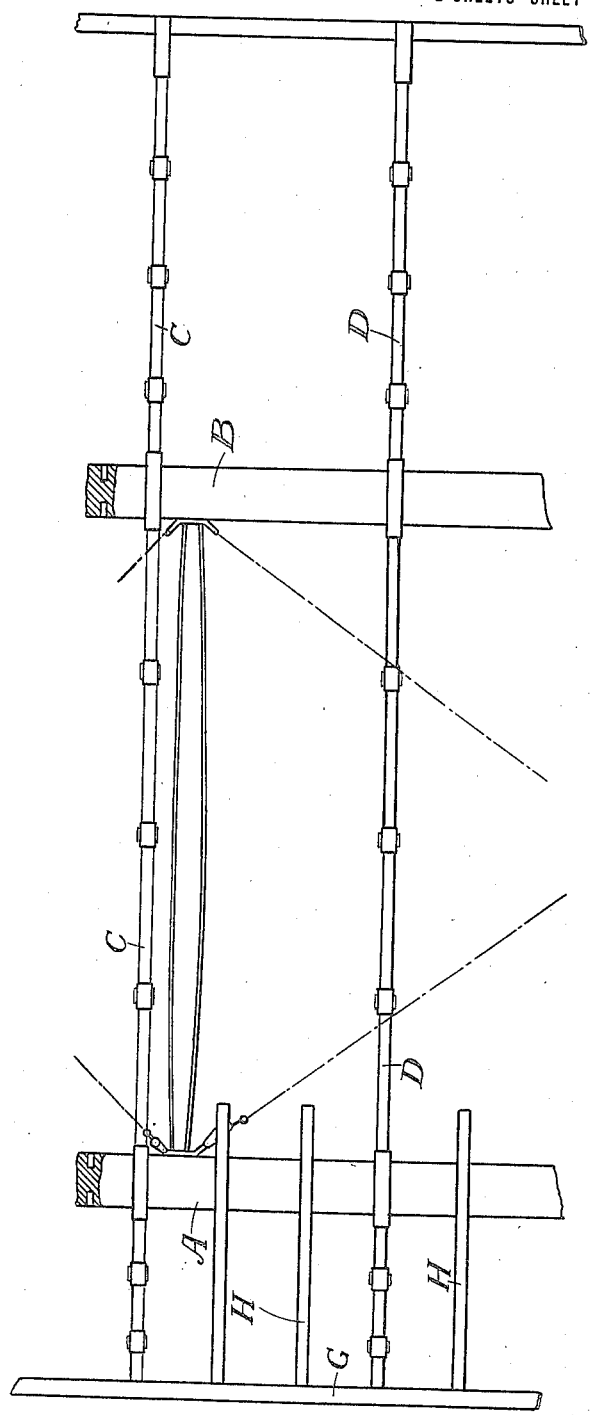
A. V. Roe
Inventor
per Geo. A. Hutchinson
Attorney

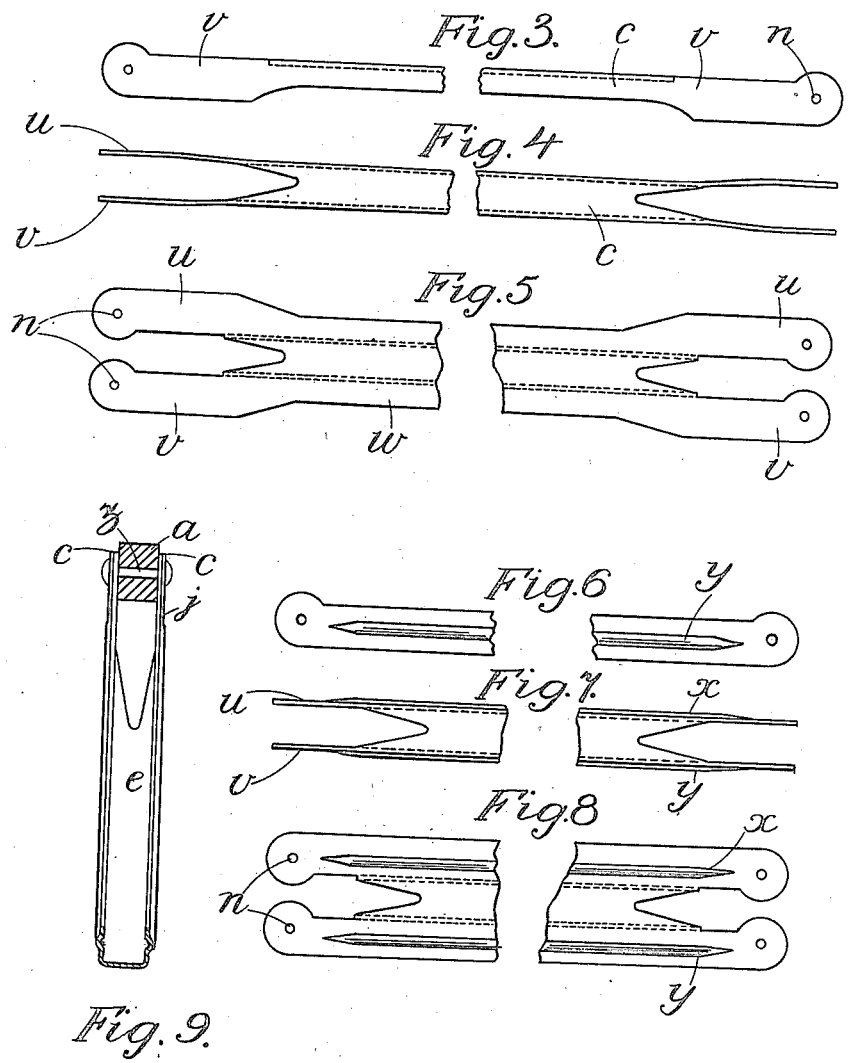

UNITED STATES PATENT OFFICE.

ALLIOTT VERDON ROE, OF HAMBLE, ENGLAND.

LIGHT FRAMED STRUCTURE SUCH AS AIRCRAFT-WINGS AND THE LIKE.

1,301,747.

Specification of Letters Patent.

Patented Apr. 22, 1919.

Application filed May 12, 1917. Serial No. 168,226.

*To all whom it may concern:*

Be it known that I, ALLIOTT VERDON ROE, a subject of the King of Great Britain, residing at Hamble, Southampton, England, have invented certain new and useful Improvements in Light Framed Structures Such as Aircraft-Wings and the like, of which the following is a specification.

This invention relates to improvements in the construction of light framed structures, such as the wings, or other aerofoils, or spars of aircraft, the frames or lattice girder members of airships, or any other framing requiring to be of very light weight.

The objects of the invention are, firstly, to construct a framed structure with bracing and strut members in such a form that the structure is both strong and light; secondly, so to adapt this form that it is capable of production by a cheap machine process, such as stamping; and, thirdly, to apply this structure to aircraft use, more especially in the construction of aerofoils, wings for aeroplanes, and similar structures in which both lightness and strength are required.

According to this invention as applied to an aerofoil, say in constructing the wings of an aeroplane, the framing of the wing is constructed with spars (which themselves may be framed up in accordance with the invention) in the usual manner, and transverse framed ribs embracing the said spars are constructed at intervals with bracing and strut members joining the longitudinal members of the structure, these bracing members being constructed with channel section bodies and forked ends formed by stamping them from flat plates and bending them to shape longitudinally, after which they are joined to the longitudinal members by a pin or rivet connection, and so that the said member comes within the fork.

The accompanying drawings show the invention as applied to the transverse framed ribs employed in constructing the wing of an aeroplane; since the general outline of such construction is well known, I have thought it sufficient to illustrate the detailed portions to which the invention is particularly applicable, to this end:—

Figure 1 shows in elevation a detached rib;

Fig. 2 is a partial plan of a wing illustrating the disposition of the cross rib in relation to the main spars;

Figs. 3, 4 and 5 illustrate a tension member in elevation, plan, and as developed for a stamping, respectively;

Figs. 6, 7 and 8 illustrate similar views respectively of a compression strut;

Fig. 9 illustrates the rib in section at a joint with the bracing members; and

Fig. 10 illustrates a triangular lattice girder constructed in accordance with the invention.

Referring first to Fig. 2, it will be seen that there are a series of cross ribs marked generically C, D, which are attached to the main framing spars A, B, and Fig. 1 illustrates the construction of one such rib in detail, it being understood that when the framing is together it is all covered with fabric which is directly attached to the cross ribs forming the complete wing.

Referring now to Figs. 1 and 9, $a$, $b$ represent the top and bottom ribs of a cross rib such as C attached to the spars A, B, with their larger dimension at right angles thereto and reinforced at each spar joint by a wrapping of fabric individually; the top and bottom ribs may further be bound together by threads passing also through the covering fabric, indeed this is desirable for aerodynamic reasons and the sewing prevents the narrow ribs moving or bending sidewise; thus, though narrow, the ribs are securely held and the depth allows of their better withstanding rough handling and loading.

Primarily, the construction between the spars A and B will suffice in some cases if the tension members $c$, $d$, and the struts $e$, $f$ are fitted to the cross ribs, but in the large size wings the space between $e$ and $f$ will also be fitted with the further strut $i$ and the tension members $g$, $h$; being the equivalent of what in ordinary practice is a tension rod, the tension members are also referred to herein as tension rods.

Upon the leading edge of the spar A, further tension rods $k$, $l$ and a strut $m$ are preferably employed, disposed approximately as shown on the drawing, and similarly tension members $o$, $p$, $q$ and struts $r$, $s$ are used to support the trailing end of the cross rib; it must be understood, however, that under certain conditions in structures of this class a compression member may come under tension and vice versa. Preferably such members will be made of thin steel, or aluminium, but other materials may be used.

Figs. 3, 4 and 5, show a tension member such as c in detail, the essential feature being that it may be stamped from a piece of flat material as indicated in Fig. 5, and bent thereafter into a channel section such as is shown in elevation in Fig. 3 and in plan in Fig. 4; by employing the shape of forked end shown in Fig. 5 with the pin bosses approaching each other inwardly, material is saved and the necessary sectional strength and lightness is retained; it should be noted that the cross sections of the two legs $u$, $v$ through the pinhole $n$ are made substantially the same as the cross section at a point $w$ of the straight channel section, thus no superfluous material is carried at all.

The struts, shown in Figs. 6, 7 and 8 are similarly represented as in the case of the tension rods, and are, to all intents and purposes, the same, with the addition of the embossed parts $x$, $y$ along the sides and extending to the edge of the pin bosses. The provision of the embossed sides stiffens the strut under compression without adding weight, and they may be produced also along the back if desired.

Fig. 9 shows a section through a joint such as $j$, the fixing pin $z$ being either a rivet, or a bolt.

When using the joint and rod construction as set out above, the leading edge of the wing may be formed with the usual continuous bar G, but hollowed out on the inside and provided with V-shaped packing blocks such as F of similar thickness to the ribs $a$, $b$. Short intermediate ribs H as indicated in plan in Fig. 2, may also be employed at intervals to support the upper fabric surface of the plane, with no corresponding lower ribs, a V-shaped packing block somewhat like F being employed beyond which the fabric is unsupported on the lower side except by the principal cross ribs.

Preferably the framing will be of timber as is usual, and the material of the struts and tension rods of steel, or aluminium alloy, but other materials may be used if suitable.

Since the cross ribs may be reinforced by binding at the points of connection to the main framing spars and may also be tied by threads through the covering fabric to the opposite rib, any tendency to move sidewise due to the narrow section will be prevented; the construction therefore offers great strength and lightness for the purpose in view, while the possibility of connecting the rods to the ribs by rivets is also a great advantage.

Heretofore the ribs have been of greater width than depth, necessitated by the other constructive features employed and requiring greater relative weight to attain the same strength as in my invention, while the old construction was liable to be injuriously affected by changes in the weather conditions.

Fig. 10 illustrates a three-cornered lattice girder such as may be used in the construction of airships, aeroplane spars, and generally for light framed structures. In this case, angular longitudinal members 1, 2, 3 are connected by the channeled compression struts $e$ $e$ arranged in zig zag fashion along each side of the girder, the forked ends being merely reduced in width after being bent to the channel form so that they fit the sides of the angular members.

As shown, they can be of varying length so as to form the girder with camber. If necessary, they can be formed with one side of the fork in line with its side, so that two struts crossing each other may be used.

What I claim as new and useful and of my own invention, and desire to secure by Letters Patent, is;

1. In light framed structures of the class described, the combination of two or more longitudinal members, with bracing and strut members each of which is formed with a channel section body and forked ends, and a rivet or other pin connection passing through the said forked ends and the longitudinal members, all substantially as and for the purpose set forth.

2. In light framed structures of the class described, the combination of two or more longitudinal members, with bracing and strut members each of which is formed with a channel section body and forked ends, and a rivet or other pin connection passing through the said forked ends and the longitudinal members, the said bracing members being formed from flat stampings bent eventually into the shape of a channel with forked ends, substantially as described herein.

3. In light framed structures of the class described, the combination of two or more longitudinal members, with bracing and strut members each of which is formed with a channel section body and forked ends, and a rivet or other pin connection passing through the said forked ends and the longitudinal members, the said bracing members being formed from flat plates stamped with forked ends having inwardly projecting perforated boss portions which stampings are eventually bent into channel form with forked ends, whereby the maximum cross sectional area of the member is retained in the perforated eye bosses without waste of material.

4. In light framed structures of the class described, the combination of two or more longitudinal members, with bracing and strut members each of which is formed with a channel section body and forked ends, and a rivet or other pin connection passing through the said forked ends and the longitudinal members, the said strut members being formed from flat plates stamped with forked ends and longitudinal portions embossed in the material, which stampings are eventually bent into channel form with forked ends and with said embossed portions in the sides of the channel.

5. In framed structures for aircraft aerofoils or wings, the combination of longitudinal spars, framed transverse ribs embracing the said spars and having a longitudinal member on each face of same, means for connecting the leading ends and the trailing ends respectively of the transverse ribs, bracing and strut members connecting the rib members on each face of the spars across the depth of same, each of which bracing and strut members is formed with a channel section body and forked ends, and rivet or other pin connections passing through the said forked ends and the longitudinal members of the transverse ribs.

6. In framed structures for aircraft aerofoils or wings, the combination of longitudinal spars, framed transverse ribs embracing the said spars and having a longitudinal member on each face of same, the said member being of solid rectangular section disposed with its deepest section at right angles to the said spars or their equivalent where attached to same, means for connecting the leading ends and the trailing ends respectively of the transverse ribs, bracing and strut members connecting the rib members on each face of the spars across the depth of same, each of which bracing and strut members is formed with a channel section body and forked ends, and rivet or other pin connections passing through the said forked ends and the longitudinal members of the transverse ribs.

In testimony whereof I have affixed my signature.

ALLIOTT VERDON ROE.